United States Patent
Soneji et al.

(10) Patent No.: US 11,602,655 B2
(45) Date of Patent: Mar. 14, 2023

(54) NETWORKED HAZARD DETECTORS WHICH MONITOR FOR READINESS AND AVAILABILITY

(71) Applicant: Carrier Corporation, Palm Beach Gardens, FL (US)

(72) Inventors: Jignesh Soneji, Telangana (IN); Lakshman Subramanian, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/973,346

(22) PCT Filed: Dec. 4, 2019

(86) PCT No.: PCT/US2019/064405
§ 371 (c)(1),
(2) Date: Dec. 8, 2020

(87) PCT Pub. No.: WO2020/117904
PCT Pub. Date: Jun. 11, 2020

(65) Prior Publication Data
US 2021/0283445 A1 Sep. 16, 2021

(30) Foreign Application Priority Data
Dec. 6, 2018 (IN) .............................. 201811046107

(51) Int. Cl.
*H04W 12/04* (2021.01)
*A62C 37/50* (2006.01)
(Continued)

(52) U.S. Cl.
CPC .............. *A62C 37/50* (2013.01); *G08B 21/18* (2013.01); *G08B 25/00* (2013.01)

(58) Field of Classification Search
CPC ........ A62C 37/50; G08B 25/00; G08B 21/18; H04W 60/00; H04W 4/38; H04W 4/70; H04W 4/90; H04W 84/18; H04W 88/04
See application file for complete search history.

(56) References Cited

U.S. PATENT DOCUMENTS 4,363,031 A * 12/1982 Reinowitz ................ G08B 1/08
340/517
5,898,369 A * 4/1999 Godwin .................... G08B 3/10
340/539.26
(Continued)

FOREIGN PATENT DOCUMENTS

CN 105344053 A 2/2016
EP 2159765 A1 3/2010
(Continued)

OTHER PUBLICATIONS

ISR/WO; PCT/US2019/064405; mailed Feb. 10, 2020; 17 pages.

*Primary Examiner* — Hai Phan
*Assistant Examiner* — Son M Tang
(74) *Attorney, Agent, or Firm* — Cantor Colburn LLP

(57) ABSTRACT

Disclosed is a system that includes a first device of a plurality of devices operatively connected over a network for responding to a detected hazard, wherein the first device: monitors the network for self-identifying broadcasts the plurality of devices, and when the first device receives over the network self-identifying broadcasts from a second device, the first device retransmits the self-identifying broadcasts into the network.

10 Claims, 10 Drawing Sheets

(51) Int. Cl.
 *G08B 21/18* (2006.01)
 *G08B 25/00* (2006.01)

(56) References Cited

U.S. PATENT DOCUMENTS

| | | | | |
|---|---|---|---|---|
| 6,078,269 | A * | 6/2000 | Markwell | G08B 17/11 |
| | | | | 340/517 |
| 6,759,956 | B2 * | 7/2004 | Menard | G08B 1/08 |
| | | | | 340/539.19 |
| 6,768,424 | B1 * | 7/2004 | Morris | G08B 21/24 |
| | | | | 340/625 |
| 7,051,570 | B2 | 5/2006 | Brazier et al. | |
| 7,081,815 | B2 * | 7/2006 | Runyon | E05G 1/10 |
| | | | | 169/51 |
| 7,174,783 | B2 * | 2/2007 | McSheffrey, Jr. | A62C 37/50 |
| | | | | 73/291 |
| 7,188,679 | B2 | 3/2007 | McSheffrey | |
| 7,495,544 | B2 * | 2/2009 | Stilp | H04W 12/126 |
| | | | | 340/10.1 |
| 7,733,235 | B2 * | 6/2010 | Baker | G08B 17/00 |
| | | | | 340/628 |
| 7,891,241 | B2 | 2/2011 | McSheffrey et al. | |
| 8,069,470 | B1 * | 11/2011 | Montenegro | H04L 9/3226 |
| | | | | 726/6 |
| 8,253,574 | B2 * | 8/2012 | Li | G08B 7/066 |
| | | | | 340/584 |
| 8,378,808 | B1 * | 2/2013 | Gwaltney | G08B 29/183 |
| | | | | 340/506 |
| 8,792,645 | B2 * | 7/2014 | Schmit | H04L 63/02 |
| | | | | 380/270 |
| 8,833,477 | B2 | 9/2014 | Kang | |
| 8,842,016 | B1 * | 9/2014 | Cazanas | A62C 37/50 |
| | | | | 340/611 |
| 8,981,927 | B2 | 3/2015 | Mcsheffrey | |
| 9,155,928 | B2 | 10/2015 | Vilas Blanco et al. | |
| 9,162,097 | B2 | 10/2015 | Pichard et al. | |
| 9,235,976 | B2 * | 1/2016 | Sloo | F24F 11/34 |
| 9,253,635 | B2 * | 2/2016 | Berenberg | H04W 12/06 |
| 9,541,625 | B2 | 1/2017 | Mcsheffrey | |
| 9,566,460 | B2 | 2/2017 | Bacchin | |
| 9,685,061 | B2 * | 6/2017 | Shih | G08B 21/02 |
| 9,747,569 | B2 | 8/2017 | Mcsheffrey | |
| 9,827,456 | B2 | 11/2017 | Mcmanama | |
| 9,860,716 | B2 * | 1/2018 | Lee | G08B 1/08 |
| 9,961,477 | B2 | 5/2018 | Wesby | |
| 9,990,824 | B2 * | 6/2018 | Rao | G01P 5/00 |
| 10,506,688 | B2 * | 12/2019 | Abraham | G05B 11/28 |
| 2008/0309502 | A1 * | 12/2008 | Boccia | G08B 25/009 |
| | | | | 340/584 |
| 2009/0251318 | A1 * | 10/2009 | Ho | H04W 12/126 |
| | | | | 340/571 |
| 2009/0301739 | A1 * | 12/2009 | Rother | A62C 37/50 |
| | | | | 169/43 |
| 2010/0046596 | A1 * | 2/2010 | Suzuki | G08B 25/007 |
| | | | | 375/227 |
| 2010/0226342 | A1 * | 9/2010 | Colling | H04W 56/002 |
| | | | | 370/336 |
| 2010/0245570 | A1 | 9/2010 | Riedel | |
| 2013/0258872 | A1 * | 10/2013 | Drake | H04L 41/0833 |
| | | | | 370/252 |
| 2013/0322418 | A1 * | 12/2013 | Ho | H04W 48/20 |
| | | | | 370/338 |
| 2014/0145843 | A1 * | 5/2014 | Richard | A62C 37/50 |
| | | | | 340/514 |
| 2014/0169561 | A1 * | 6/2014 | Schmit | H04W 12/04 |
| | | | | 380/270 |
| 2016/0292978 | A1 | 10/2016 | Lee | |
| 2016/0316342 | A1 * | 10/2016 | Narasimhan | H04W 4/029 |
| 2016/0332012 | A1 * | 11/2016 | Lenkeit | A62C 37/44 |
| 2016/0345317 | A1 * | 11/2016 | Levesque | H04W 40/02 |
| 2017/0053527 | A1 * | 2/2017 | McSheffrey | G08B 29/181 |
| 2017/0209725 | A1 | 7/2017 | Hu et al. | |
| 2017/0209726 | A1 * | 7/2017 | Hu | H04Q 9/00 |
| 2019/0156082 | A1 * | 5/2019 | Berg | G08B 13/24 |
| 2019/0357124 | A1 * | 11/2019 | Jia | H04W 76/10 |
| 2021/0345085 | A1 * | 11/2021 | Anselm | H04W 8/005 |

FOREIGN PATENT DOCUMENTS

FR 2931364 A1 11/2009
KR 100794782 B1 1/2008

\* cited by examiner

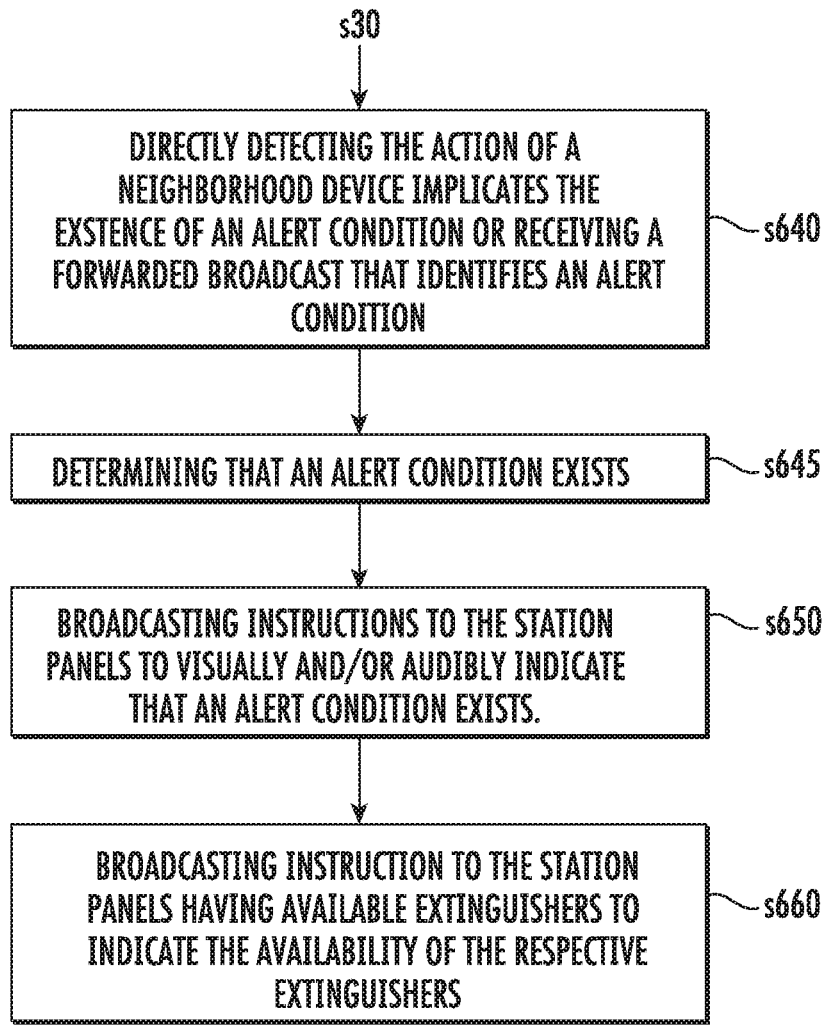

NETWORKED HAZARD DETECTORS WHICH MONITOR FOR READINESS AND AVAILABILITY

CROSS REFERENCE TO RELATED APPLICATIONS

This is a US National Stage of Application No. PCT/US2019/064405, filed on Dec. 4, 2019, which claims the benefit of IN Application No. 201811046107 filed Dec. 16, 2018, the disclosures of which are incorporated herein by reference.

BACKGROUND

Exemplary embodiments pertain to the art of hazard monitoring and more specifically to an interactive network of hazard detectors which monitor for readiness and availability.

Success of firefighting in residential and commercial buildings depends on the availability of correctly filled extinguisher being at the right location when needed. Portable fire extinguisher cylinders ("cylinders") may be installed at specified locations throughout a building for easy access in case of a fire emergency. They should be ready to operate when the need arises. Cylinders may need to be serviced and maintained at regular intervals to enable desired availability and readiness. When utility service providers fail to adhere to service and maintenance schedules, the desired availably and readiness of the cylinders may be lost. In some cases cylinders may not be serviced regularly and may lay idle for months and sometimes years. As a result in case of a fire emergency, the cylinders may not be ready or not be available for use.

BRIEF DESCRIPTION

Disclosed is a system that includes a first device of a plurality of devices operatively connected over a network for responding to a hazard, wherein the first device: monitors the network for self-identifying broadcasts the plurality of devices, and when the first device receives over the network self-identifying broadcasts from a second device, the first device retransmits the self-identifying broadcasts into the network.

In addition to one or more of the above disclosed features or as an alternate, before retransmitting the self-identifying broadcast into the network, the first device determines that the second device is currently registered as being on the network and that a signal strength of the self-identifying broadcasts for the second device is above a first signal strength threshold.

In addition to one or more of the above disclosed features or as an alternate, when the second device is not currently registered as being on the network and the signal strength of the self-identifying broadcasts for the second device is above the first signal strength threshold, the first device determines that the second device is new to the network.

In addition to one or more of the above disclosed features or as an alternate, the first device is a hazard extinguisher, a hazard detector, or a panel for selectively relaying formation visually and/or audibly, and the second device is a hazard extinguisher.

In addition to one or more of the above disclosed features or as an alternate, the first device: monitors the network for alert conditions based on activities of the second device, and when the first device identifies an alert condition exists, the first device broadcasts into the network an alert message.

In addition to one or more of the above disclosed features or as an alternate, the first device identifies an alert condition when failing to receive periodic self-identifying broadcasts from the second device for a period of time that is greater than a first time threshold.

In addition to one or more of the above disclosed features or as an alternate, the first device identifies an alert condition when periodic self-identifying broadcasts from the second device fall below a second signal strength threshold for a period of time that is greater than a second time threshold.

In addition to one or more of the above disclosed features or as an alternate, the first device monitors the network for a maintenance request from the second device, and when the first device receives the maintenance request from the second device, the first device retransmits into the network the maintenance request into the network.

In addition to one or more of the above disclosed features or as an alternate, the first device receives from another device on the network a broadcast that indicates one or more of (i) the second device is new to the network, (ii) an alert condition exists in the network, (iii) the second device requires maintenance, and the first device retransmits the broadcast to the network.

Further disclosed is a hazard response system that includes a system panel and a plurality of devices operatively connected over a network, wherein the devices have one or more of the above disclosed features, wherein the system panel directly or through retransmitted broadcasts is configured to: (i) determine that the second device is added to the network and broadcast instructions to network devices to recognize the second device as being part of the network; (ii) determine that an alert condition exists and broadcasting instructions to station panels to visually and/or audibly indicate that an alert condition exists; and (iii) determine that the second device requires maintenance and broadcast instructions directed to one of plural station panels on the network to visually display and/or audibly indicate that the second device requires maintenance.

BRIEF DESCRIPTION OF THE DRAWINGS

The following descriptions should not be considered limiting in any way. With reference to the accompanying drawings, like elements are numbered alike:

FIGS. 6A-6C identify steps performed by a neighborhood system panel when monitoring for newly added devices, for alert conditions and for maintenance needs for neighborhood devices according to a disclosed embodiment.

DETAILED DESCRIPTION

A detailed description of one or more embodiments of the disclosed apparatus and method are presented herein by way of exemplification and not limitation with reference to the Figures.

Figure 1:
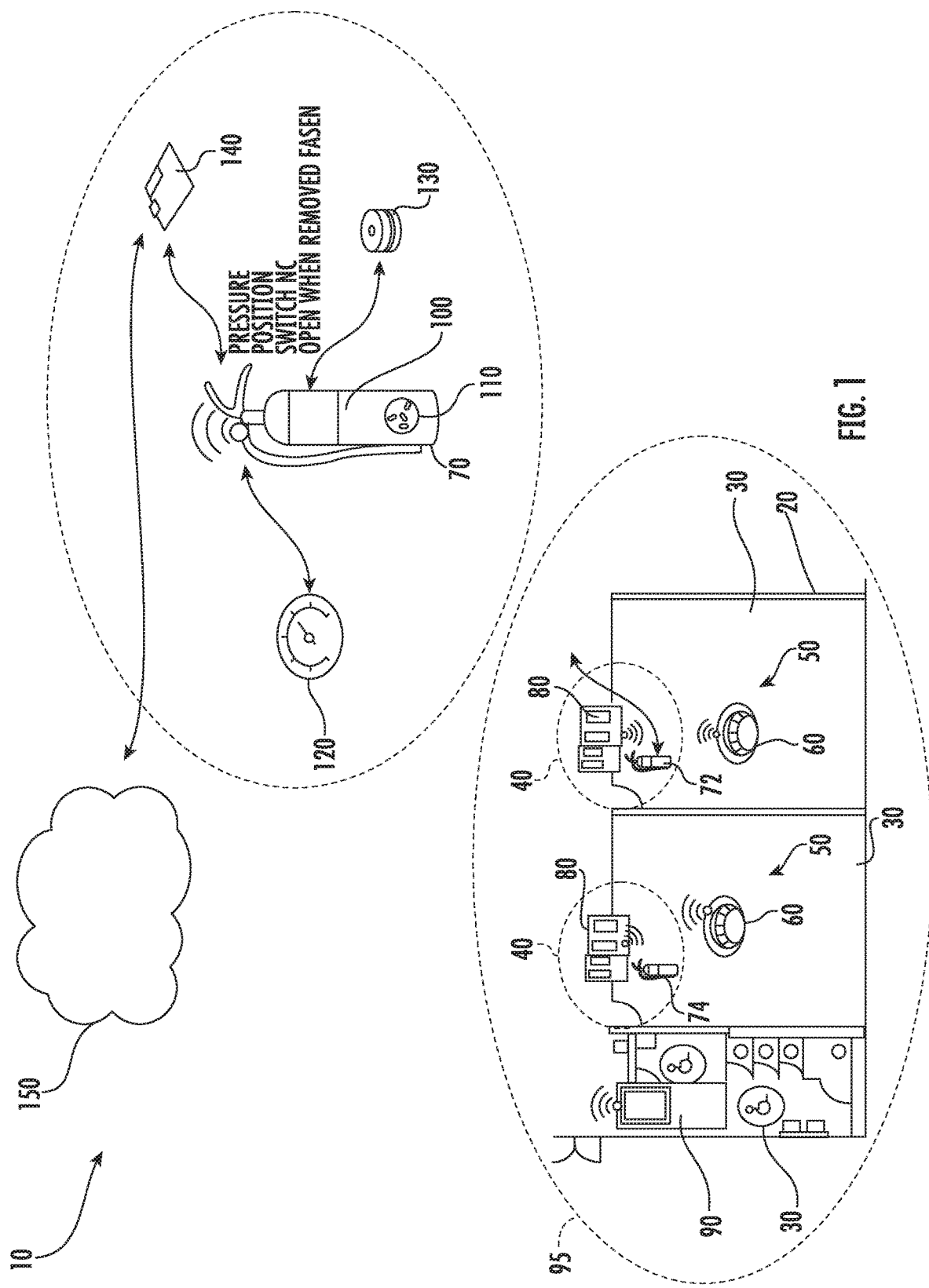
FIG. 1 illustrates a network of hazard detectors disposed in a building according to a disclosed embodiment.

Repeated reference throughout this disclosure will be made to FIG. 1. FIG. 1 illustrates a hazard response network generally referred to as 10 disposed in a building 20 according to a disclosed embodiment. The building 20 may have a plurality of partitioned areas generally referred to as 30. The partitioned areas 30 may have characteristics distinct from other areas, such as physical location. Various ones of the areas 30 may have a respective plurality of hazard response stations therein generally referred to as 40.

Various ones of the portioned areas 30 may include a respective plurality of devices generally referred to as 50. The plurality of devices 50 may include a respective plurality of hazard detectors generally referred to as 60. The plurality of devices 50 may also include a respective plurality of extinguishers generally referred to as 70 including a first extinguisher 72 and a second extinguisher 74, and a respective plurality of station panels generally referred to as 80. The extinguishers 70 and the station panels 80 may be disposed in the hazard response stations 40. The station panels 80 may be used for providing visual and/or audible alerts or messages as indicated below. The plurality of devices 50 may further include a system panel 90, disposed in one of the partitioned areas 30, for monitoring activities around the network 10.

The network 10 in the building 20 may be one of a plurality of discrete hazard response networks distributed among different floors and/or portions of same floor in the building 20. Each discrete network may be considered a hazard response neighborhood, also generally referenced as 95. Devices 50 registered to a neighborhood 10 may alternatively be referred to as neighborhood devices 50.

The extinguishers 70 may comprise a respective plurality of cylinders generally referred to as 100, with suppressant 110 therein. In addition, the extinguishers 70 may include a respective plurality of pressure sensors generally referred to as 120 and a respective plurality of positional sensors generally referred to as 130. Moreover the plurality of devices 50 may include a respective plurality of controllers generally referred to as 140 that provide for communicating over a telecommunications network 150 and performing algorithms or calculations as described below with respect to FIGS. 2-7.

Figure 2:
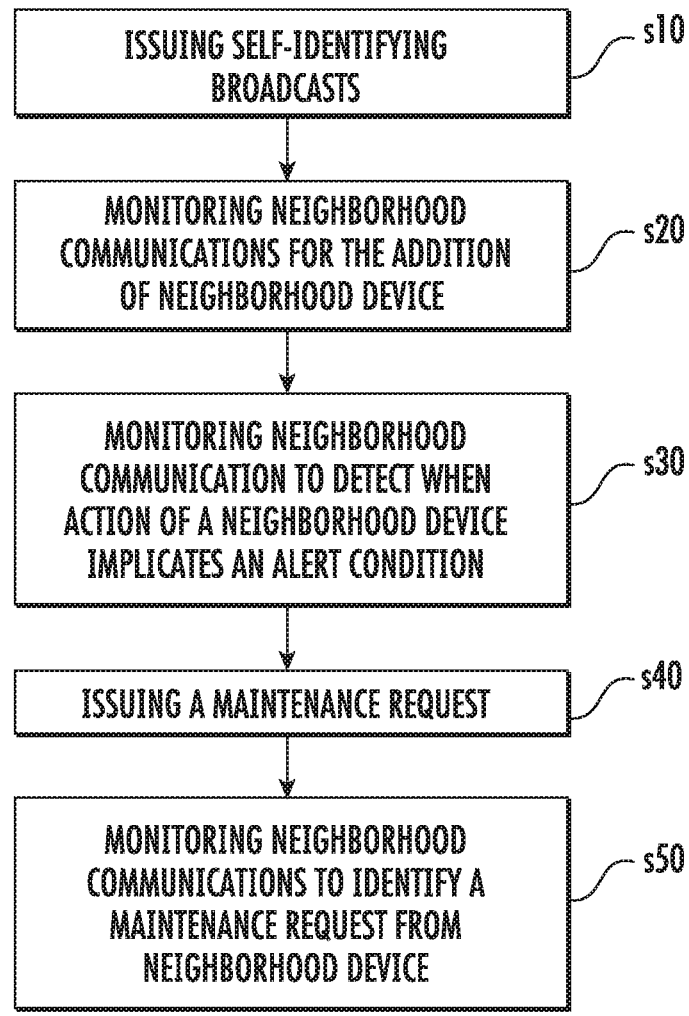
FIG. 2 illustrates process performed by devices to monitor for newly added neighborhood devices within a network in the building, to monitor for alert conditions in the neighborhood, and to monitor for maintenance needs for neighborhood devices within a network according to a disclosed embodiment.

Turning to FIG. 2, various ones of the devices 50 may be capable of performing one or more processes generally including: S10 of issuing self-identifying broadcasts; S20 of monitoring neighborhood communications to detect other self-identifying broadcasts and thereby track an inventory of neighborhood devices 50; S30 of monitoring neighborhood communication to detect when a neighborhood device 50 is being utilized to address an alert condition; S40 of issuing a maintenance request; and S50 of monitoring neighborhood communications to identify a maintenance request from another neighborhood device 50. Each of these processes is addressed in greater detail below.

In one embodiment the extinguishers 70 may each be configured to perform processes S10-S50. The detectors 60 may be each configured to perform processes S10-S30 and S50. The station panels 80 may each be configured to perform processes S10, S20 and S50, as well visually displaying and/or audibly sounding alerts. The station panels 80 may also be configured to function as routers and/or repeaters for retransmitting information by and between the plurality of neighborhood devices 50 and the system panel 90. The system panel 90 may be configured to perform processes S20, S30 and S50, and instruct station panels 80 on processing alerts by displaying and/or announcing relevant information.

Figure 3A:
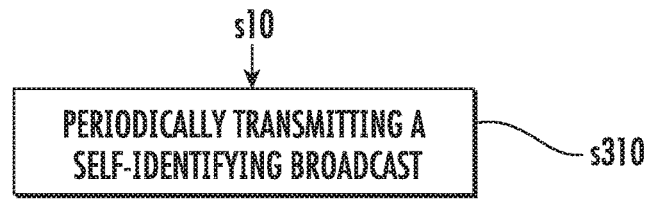
FIGS. 3A-3C identify steps performed by devices to monitor for newly added neighborhood devices within a network according to a disclosed embodiment.

Turning to FIG. 3A, the figure illustrates steps performed by a neighborhood device 50 such as the first extinguisher 72 executes the process S10 of issuing self-identifying broadcasts. Such broadcasts may include a unique ID (identifier) and a device type. The device type may be, for example, extinguisher, detector, station panel and other inputs and output modules that are typically used in fire panel installations. Such broadcasts may be issued every second.

Figure 3B:
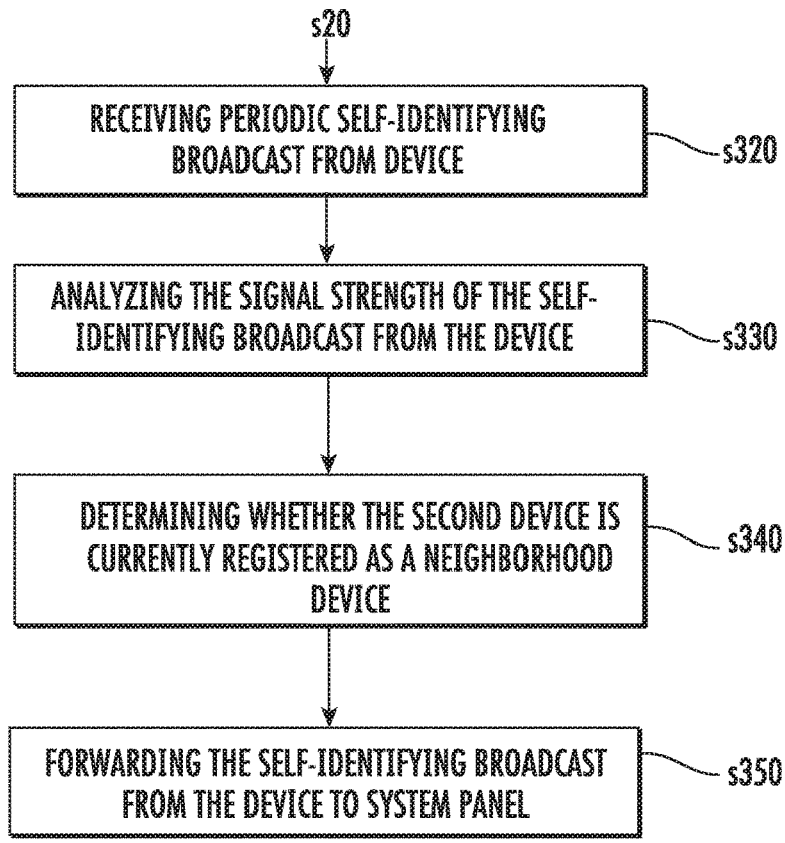

Turning to FIG. 3B, the figure illustrates steps performed by a neighborhood device 50 such as the first extinguisher 72 executing process S20 of monitoring neighborhood communications to detect the addition of another devices 50 such as the second extinguisher 74 to the neighborhood 10. From such monitoring, the system panel 90 and neighborhood devices 50 may track an inventory of all neighborhood devices 50. For example at step S320 the first extinguisher 72 may receive the periodic self-identifying broadcast from the second extinguisher 74. At step S330 the first extinguisher 72 may perform the step of analyzing the signal strength of the self-identifying broadcast from the second extinguisher 74.

When the signal strength is above a threshold, the first extinguisher 72 at step S340 may then perform the step of determining whether the second extinguisher 74 is currently registered as a neighborhood device 50. For example, the first extinguisher 72 may send an inquiry to the system panel 90 and/or may review a list of neighborhood devices stored within memory of the first extinguisher 72. If the second extinguisher 74 is not currently registered as a neighborhood device 50, step S20 may include step S350 of the first extinguisher 72 rebroadcasting the self-identifying broadcast from the second extinguisher 74. In this instance the first extinguisher 72 effectively acts as a broadcast repeater as the broadcast is being transmitted toward the system panel 90.

Figure 3C:
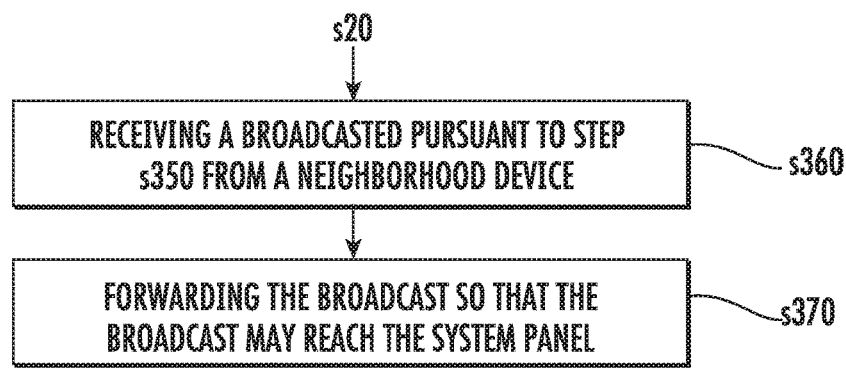

With reference to FIG. 3C, in an embodiment, when executing process S20, the first extinguisher 72 may perform step S360 receiving the self-identifying broadcast that was transmitted pursuant to step S350 from another neighborhood device 50. The first extinguisher may then execute step S370 of forwarding the broadcast so that it may reach the system panel 90. In this instance the first extinguisher 72 effectively acts as a broadcast repeater and/or router as the broadcast is being transmitted toward the system panel 90.

As indicated the station panels 80 also perform steps illustrated under FIG. 3A-3C. Relevant actions of the system panel 90 are indicated below.

Figure 4A:
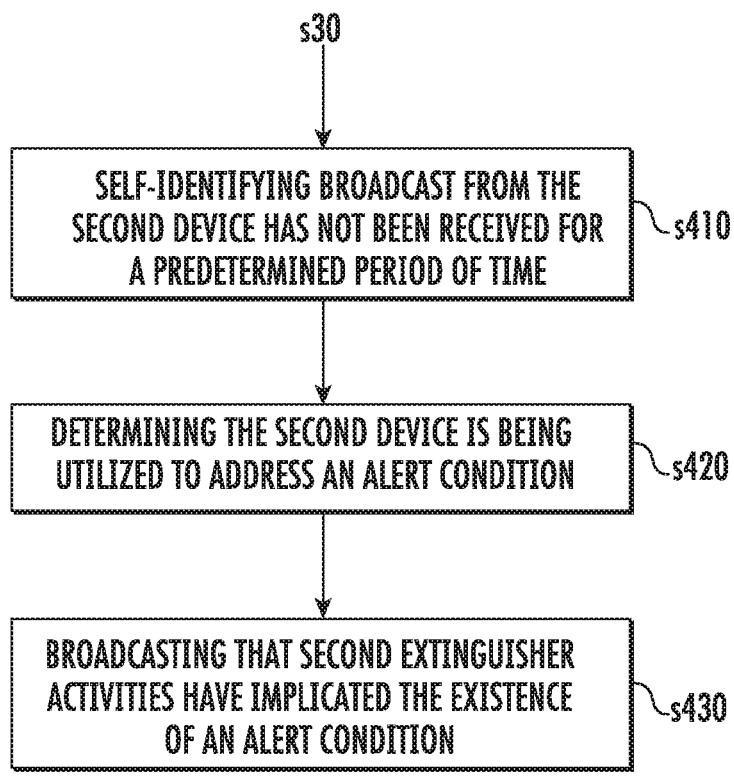
FIGS. 4A-4C identify steps performed by devices to monitor for alert conditions for neighborhood devices within a network according to a disclosed embodiment.

Turning to FIG. 4A, the figure illustrates steps performed when a neighborhood device 50 such as the first extinguisher 72 executes the process S30 of monitoring communications to determine when another neighborhood device 50 such as the second extinguisher 74 is being utilized to address an alert condition. For example at step S410 the first extinguisher 72 determines that the self-identifying broadcast from the second extinguisher 74 has not been received for a predetermined period of time. For example, if each neighborhood devices 50 issues a self-identifying broadcast every second, the predetermined period of time may be three seconds. From this the first extinguisher 72 at step S420 may determine the second extinguisher 74 is being utilized to address an alert condition. At step S430 the first extinguisher 72 broadcasts that second extinguisher activities have implicated the existence of an alert condition.

Figure 4B:
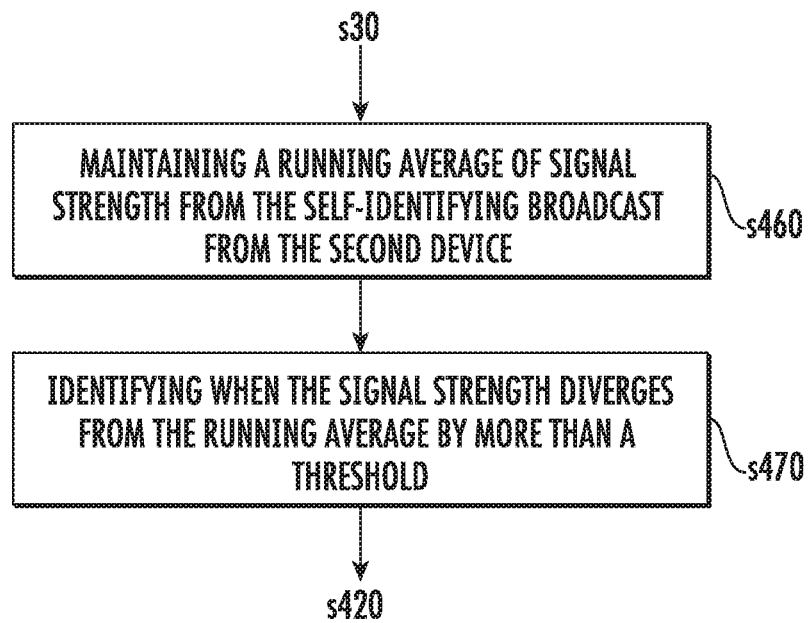

With reference to FIG. 4B, in an embodiment, when executing process S30, a decreased signal strength may be relied upon by the first extinguisher 72 to determine that second neighborhood device 50 such as the second extinguisher 74 is being utilized to respond to an alert condition. At step S460 the first extinguisher 72 may perform the step of maintaining a running average of the signal strength from the self-identifying broadcast from the second extinguisher 74. At step S470 the first extinguisher 72 may perform the step of identifying when the signal strength diverges from the running average by more than a threshold. Thereafter the process follows step S420 and S430.

Figure 4C:
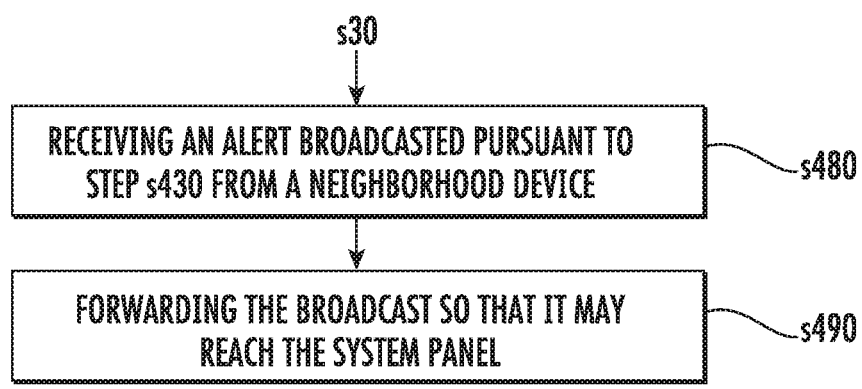

With reference to FIG. 4C, in an embodiment, when executing process S30, the first extinguisher 72 may perform step S480 receiving an alert broadcasted pursuant to step S430 from another neighborhood device 50 such as the second extinguisher 72. The first extinguisher may then execute step S490 of forwarding the broadcast so that it may reach the system panel 90. In this instance the first extinguisher 72 again effectively acts as a broadcast repeater and/or router as the broadcast is being transmitted toward the system panel 90.

As indicated the station panels 80 also perform steps illustrated under FIGS. 4A-4C. Relevant actions of the system panel 90 are indicated below.

Figure 5A:
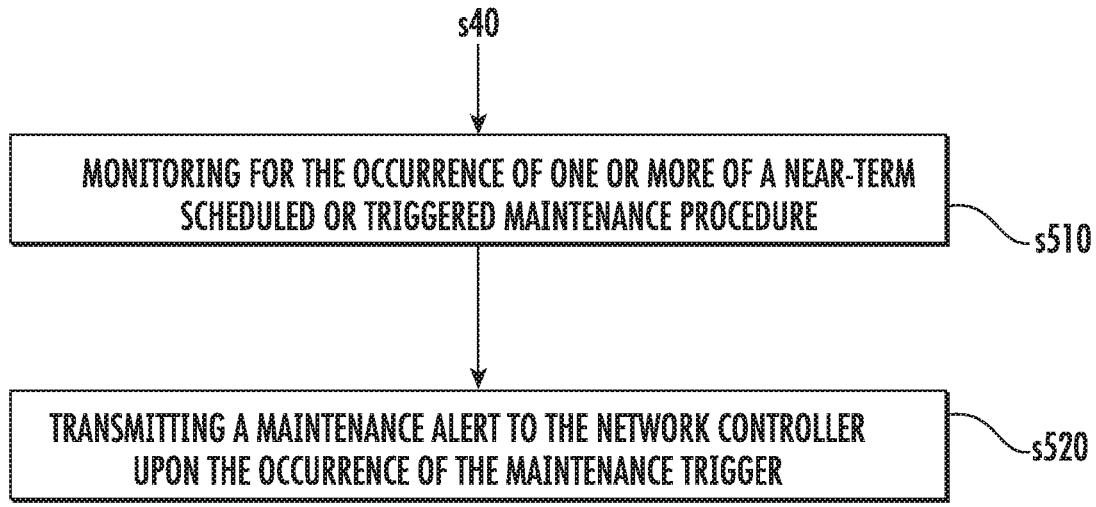
FIGS. 5A-5B identify steps performed by devices to monitor for maintenance issues for neighborhood devices within a network according to a disclosed embodiment.

Turning now to FIG. 5A, the figure illustrates steps performed according to a disclosed embodiment wherein a neighborhood device 50 issues a maintenance request as in step s40. For example, at step S510 the first extinguisher 72 may determine that a scheduled maintenance is due (for example suppressant 110 has expired) or that or a triggered maintenance event has occurred (for example pressure within the first extinguisher 72 falls below a set point as sensed from the first sensor 120, or that the extinguisher 72 has fallen over as sensed from the second sensor 130). At step S520 the first extinguisher 72 may perform the step of issuing the maintenance alert to the system panel 90.

Figure 5B:
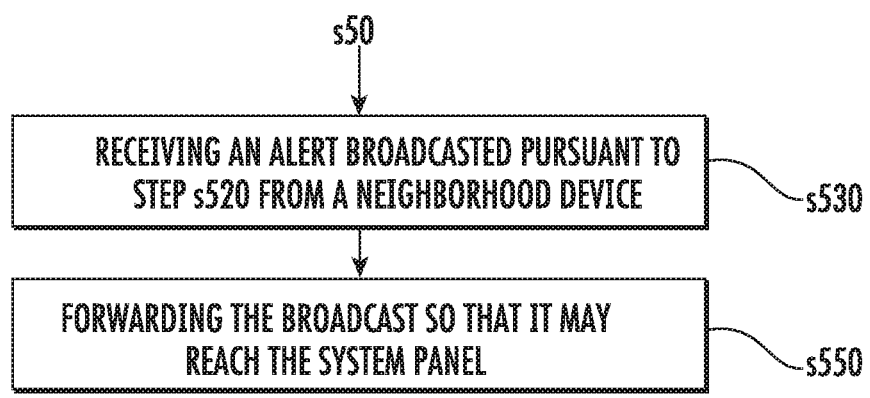

FIG. 5B illustrates when the first extinguisher 72 executes S50 by at step S530 receiving a broadcasted maintenance request from a neighborhood device 50 such as the second extinguisher 74. The first extinguisher 72 may then execute step S550 of forwarding the broadcast so that it may reach the system panel 90. Again, in this instance, the first extinguisher 72 effectively acts as a broadcast repeater and/or router as the broadcast is being transmitted toward the system panel 90.

As indicated the station panels 80 also perform steps illustrated under FIG. 5B. Relevant actions of the system panel 90 are discussed below.

Figure 6A:
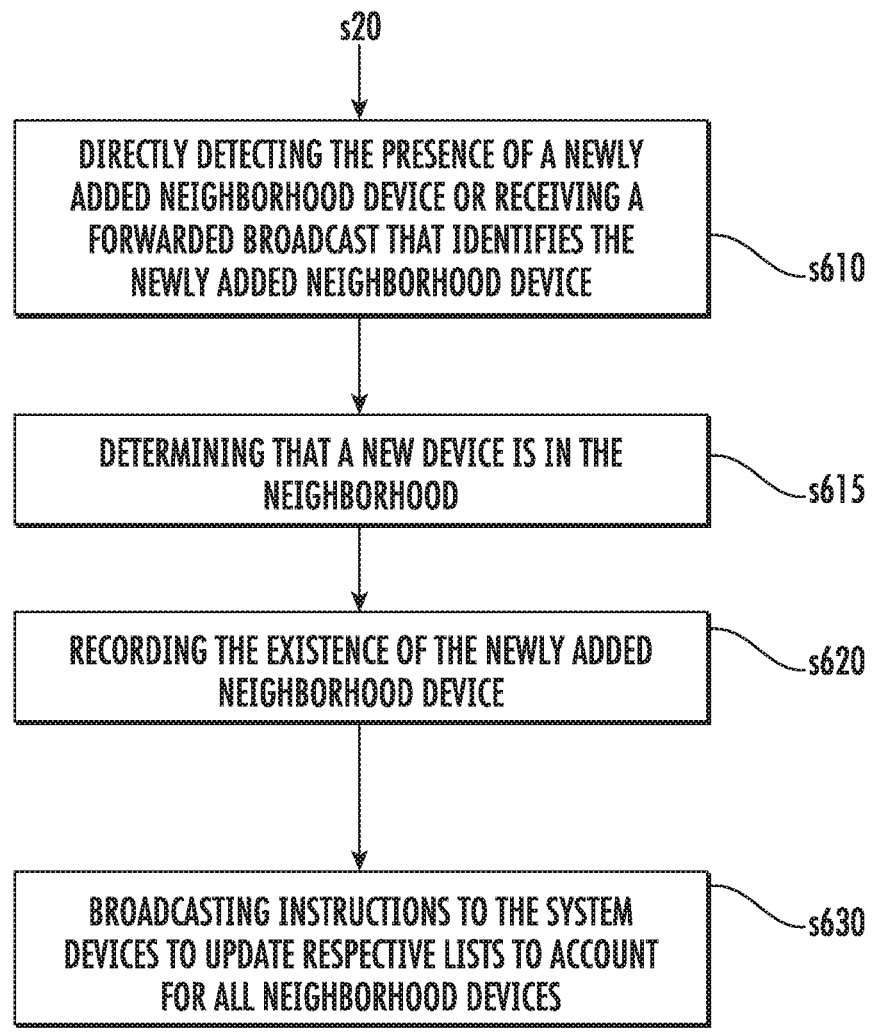

Turning to FIG. 6A the figure illustrates steps performed according to a disclosed embodiment wherein a system panel 90 identifies new devices in a network under S30. Based on steps illustrated in FIGS. 3A-3C above the system panel 90 may perform step S610 of directly detecting the presence of a newly added neighborhood device 50 or receiving a forwarded broadcast that identifies the newly added neighborhood device. From this the system panel 90 may perform step s615 of determining that the second extinguisher has joined the neighborhood 10.

Upon determining that a new device 50 such as the second extinguisher has joined the neighborhood 10, the system panel 90 may perform step S620 of recording the existence of the second extinguisher 74. Then the system panel 90 performs step S630 of broadcasting instruction to the system devices 50 to update respective lists to account for all neighborhood devices 50. Upon receiving the broadcast under S630, network devices 50 will update their lists and retransmit the broadcast so that all devices in the neighborhood are assured to receive the broadcast.

Turning to FIG. 6B the figure illustrates steps performed according to a disclosed embodiment wherein a system panel 90 identifies that actions of a device 50, such as the second extinguisher 74, implicate the existence of an alert condition. Based on steps illustrated in FIGS. 4A-4C above, the system panel 90 may perform step S640 of directly detecting the action of a neighborhood device implicates the existence of an alert condition or receiving a forwarded broadcast that identifies an alert condition. The system panel 90 may then perform the step S645 of determining that an alert condition exists.

In one embodiment the system panel 90 determines that an alert condition exists after directly detecting within a predetermined period of time the action of at least two neighborhood devices that implicates the existence of an alert condition. Alternatively the system panel 90 determines that an alert condition exists after receiving forwarded broadcast within a predetermined period of time that implicate an alert condition exists based on the actions of at least two neighborhood devices 50.

Upon determining that actions of the second extinguisher 74 implicate an alert condition, the system panel 90 may perform step S650 of broadcasting instruction to the station panels 80 to visually and/or audibly indicate that an alert condition exists. At step S660 the system panel 90 may broadcast instructions to the station panels 80 having available extinguishers (for example excluding the panel 80 in the same station 40 assigned to the second extinguisher 74) to indicate the availability of the respective fire extinguishers 70.

Figure 6C:
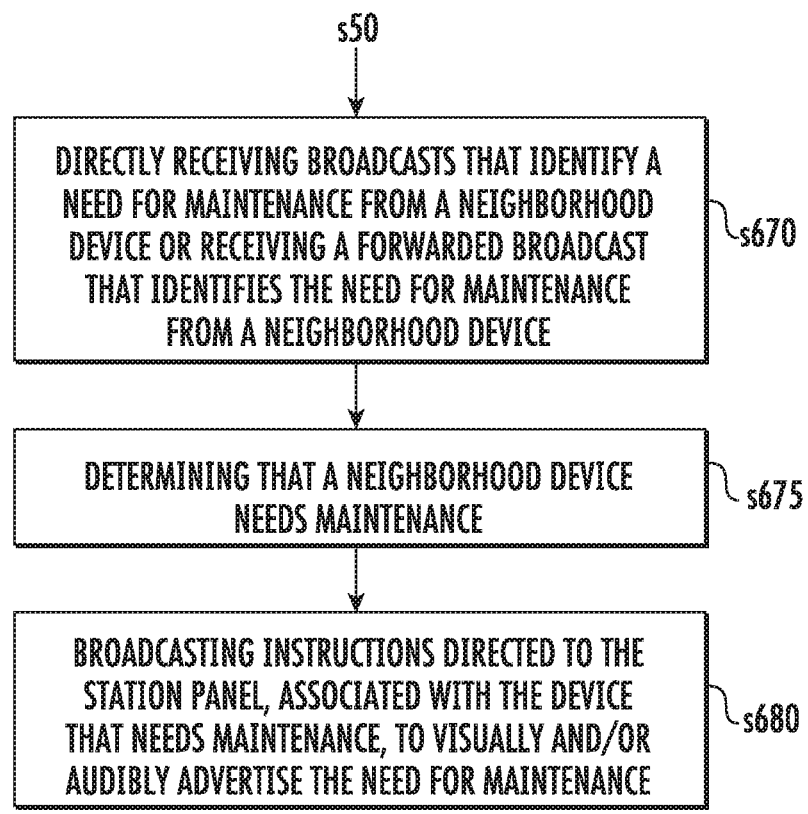

Turning to FIG. 6C the figure illustrates steps performed according to a disclosed embodiment wherein a system panel 90 identifies a maintenance issue exists with a neighborhood device 50. Pursuant to FIGS. 5A-5B, the system panel 90 may perform step S670 of directly receiving broadcasts that identify a need for maintenance from a neighborhood device 50 or receiving a forwarded broadcast that identifies the need for maintenance from a neighborhood device 50. From this the neighborhood panel 90 may perform the step S675 of determining that a neighborhood device needs maintenance.

Upon determining that a neighborhood device 50 needs maintenance, the system panel 90 performs step S680 of broadcasting instructions directed to the station panel 80 associated with the device 50 that needs maintenance. Such station panel 80 would be in the same station 40 as the device needing maintenance. The instructions may be for the station panel 80 to visually and/or audibly advertise that the device 80 needs maintenance and the type of maintenance needed. The various neighborhood devices 50 may serve as broadcast repeaters and/or routers to assure that the targeted station panel 80 receives the broadcasted instructions and can act upon the same.

The above disclosure may provide use of wireless methods to integrate portable fire extinguisher cylinders ("cylinders") with a fire panel (the system panel). For the integrated cylinders and fire panel, the disclosed embodiments may provide for (i) monitoring a readiness of a cylinder, (ii) alerting of low pressure conditions in the cylinders, and maintenance needs and service reminders for the cylinders, (iii) alerting (visually/acoustically) of non-availability of the cylinders such as cylinders falling and/or missing from installed locations and/or imminent expiration of cylinder contents, and (iv) alerting a surrounding area of the presence of the cylinder during a fire condition.

The fire panel may be configured according to its topological configuration that includes connected devices, their identification, types of detectors, device specific parameters, and corresponding input and output correlations.

For example, fire detectors and extinguishers may be assigned different categories along with their unique ID. During an initialization step the various devices and the system panel in a predetermined proximity may learn about each other and store relevant information i.e. device ID, device type, signal strength, etc. Normal operational steps may include each device receiving data from other devices in proximity and monitoring carrier signal strength for such data. Additional steps may include each device continuously averaging carrier signal strength for data transfers and applying filters to eliminate noise from the carrier signals.

If a device stops receiving data from one extinguisher in a predetermined proximity, or if carrier signal strength dips, then a device may determine that the extinguisher is being moved. The device may send an alert condition to the fire panel for the particular extinguisher. If one or more devices are reporting alert conditions of a fire extinguisher within predetermined period of time, the fire panel may then activate the station panels, which may be LED (light emitting diode) sign boards among the plurality of fire extinguishers and provide audible and visible alerts.

Benefits of the above disclosed embodiments may include (i) a preparedness for a fire emergency due to notice of low pressure in a cylinder, (ii) a local notice during a fire from integrated fire panels, which may include flashings that direct local occupants to an extinguisher, (iii) a notice on local panels of abnormalities and service reminders, (iv) a relatively easy integration with legacy bases, (v) providing notice for any attention that may be needed of a change of location or unavailability at a location of an extinguisher (vi) providing a notice of a rapid a change or fall of an extinguisher from mounting location.

Figure 7:
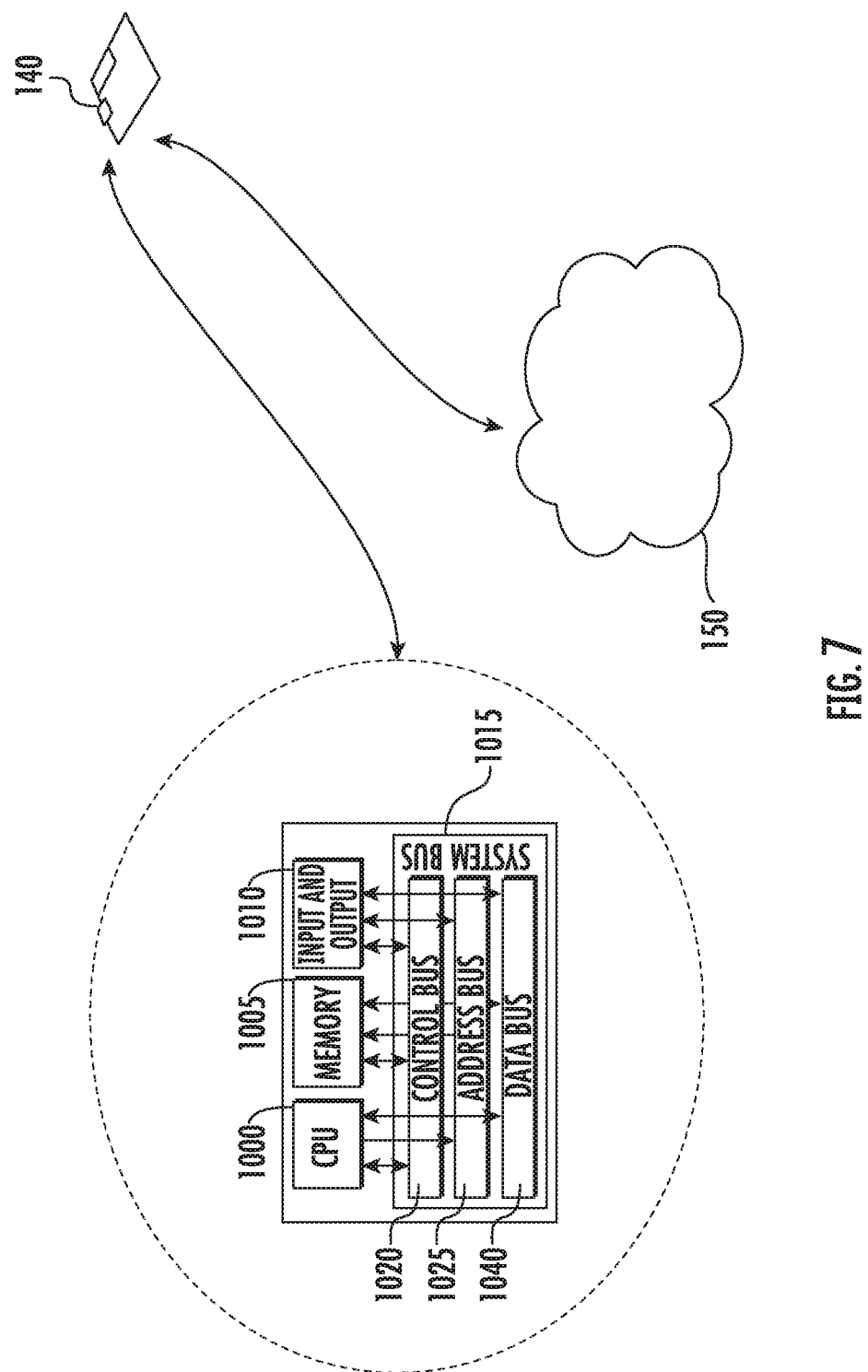
FIG. 7 illustrates technical features associated with one or more of the controllers disclosed in the application.

Turning now to FIG. 7, additional features of the controllers 140 will be briefly disclosed. As indicated above, the controllers may communicate over the network 150. The controllers may have substantially the same technology features.

The controllers 140 may be a computing device that includes processing circuitry that may further include an application specific integrated circuit (ASIC), an electronic circuit with one or more elemental circuit components such as resistors, an electronic processor (shared, dedicated, or group) 1004 and memory 1005 that executes one or more software algorithms or firmware algorithms and programs, contains relevant data which may be dynamically collected or disposed in one or more look-up tables, a combinational logic circuit that contains one or more operational amplifiers, and/or other suitable interfaces and components that provide the described functionality. For example, the processor 1004 processes data stored in the memory 1005 and employs the data in various control algorithms, diagnostics and the like including those illustrated in FIGS. 2-6C.

The controller 140 may further include, in addition to a processor 1004 and memory 1005, one or more input and/or output (I/O) device interface(s) 1010 that are communicatively coupled via an onboard (local) interface to communicate among the plurality of controllers. The onboard interface may include, for example but not limited to, an onboard system bus 1015, including a control bus 140 (for inter-device communications), an address bus 1025 (for physical addressing) and a data bus 1040 (for transferring data). That is, the system bus 1015 enables the electronic communications between the processor 1004, memory 1005 and I/O connections 1100. The I/O connections 1010 may also include wired connections and/or wireless connections. The onboard interface may have additional elements, which are omitted for simplicity, such as controllers, buffers (caches), drivers, repeaters, and receivers to enable electronic communications.

In operation, the processor 1004 onboard the controller 20 may be configured to execute software algorithms stored within the memory 1005, including those illustrated in FIGS. 2-6C, to communicate data to and from the memory 1005, and to generally control computing operations pursuant to the software algorithms. The algorithms in the memory 1005, in whole or in part, may be read by the processor 1004, perhaps buffered within the processor 1004, and then executed. The processor 1004 may include hardware devices for executing the algorithms, particularly algorithms stored in memory 1005. The processor 1004 may be a custom made or a commercially available processor 1004, a central processing units (CPU), an auxiliary processor among several processors associated with computing devices, semiconductor based microprocessors (in the form of microchips or chip sets), or generally any such devices for executing software algorithms.

The memory 1005 onboard the controller 140 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 1005 may incorporate electronic, magnetic, optical, and/or other types of storage media. The memory 1005 may also have a distributed architecture, where various components are situated remotely from one another, but may be accessed by the processor 1004.

The software algorithms in the memory 1005 onboard the controller 20 may include one or more separate programs, each of which includes an ordered listing of executable instructions for implementing logical functions. A system component embodied as software algorithms may be construed as a source program, executable program (object code), script, or any other entity comprising a set of instructions to be performed. When constructed as a source program, the software algorithms may be translated via a compiler, assembler, interpreter, or the like, which may or may not be included within the memory. Software algorithms may be capable of handling various protocols for transmissions selectable as needed for an application interface.

Some of the input/output (I/O) devices that may be coupled to the controller 20 using the system I/O Interface(s) 1010, the wired interfaces and/or the wireless interfaces will now be identified but the illustration of which shall be omitted for brevity. Such I/O devices include, but are not limited to (i) input devices such as a keyboard, mouse, scanner, microphone, camera, proximity device, etc., (ii) output devices such as a printer, display, etc., and (iii) devices that communicate both as inputs and outputs, such as a modulator/demodulator (modem; for accessing another device, system, or network), a radio frequency (RF) or other transceiver, a telephonic interface, a bridge, a router and other modes of wired and wireless communications, etc.

Further, using the wireless connection, the controller 20 may communicate over the network 150 by applying electronic short range communication (SRC) protocols.

Such protocols may include local area network (LAN) protocols and/or a private area network (PAN) protocols. LAN protocols include Wi-Fi technology, which is a technology based on the Section 802.10 standards from the Institute of Electrical and Electronics Engineers, or IEEE. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include ultra-wideband (UWB), Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Such wireless connection may include Radio-frequency identification (RFID) technology, which is another SRC technology used for communicating with an integrated chip (IC) on an RFID smartcard.

One should note that the above disclosed architecture, functionality, and/or hardware operations of the controller 140 may be implemented using software algorithms. In the software algorithms, such functionality may be represented as a module, segment, or portion of code, which comprises one or more executable instructions for implementing the specified logical function(s). It should also be noted that such modules may not necessarily be executed in any particular order and/or executed at all.

One should also note that any of the functionality of the controller 140 described herein can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device.

Further, the computer readable medium in the controller 140 may include various forms of computer readable memory 1005. For example the computer readable memory 1005 may be integral to an apparatus or device, which may include one or more semiconductors, and in which the communication and/or storage technology may be one or more of electronic, magnetic, optical, electromagnetic or infrared. More specific examples (a non-exhaustive list) of a computer-readable medium the illustration of which being omitted for brevity include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

In addition, the above distributed system of controllers is not intended to be limiting. In one embodiment, each of the controllers on the same side of the network may be the same device such that no network there between is required. In one embodiment a single on-site controller is provided instead of the distributed system of controllers. In one embodiment the controllers on the same side of the network are controlled by servers located over the World Wide Web, using a cloud computing configuration. In one embodiment, the distributed controller network is hard-wired for all telecommunication services so that no wireless network is necessary. In one embodiment redundant wireless and wired networks are utilized which automatically switch between such services to minimize network congestion and eliminate single points of failure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
a first device of a plurality of devices operatively connected over a network for responding to a detected hazard, wherein the first device is configured to:
monitor the network for self-identifying broadcasts, including a unique identifier and device type, from the plurality of devices;
receive over the network self-identifying broadcasts from a second device,
wherein the first device type is a hazard detector, or a station panel for selectively relaying formation visually and/or audibly, and the second device type is a hazard extinguisher, the first and second device types being different from each other;
determine that (i) a signal strength of the self-identifying broadcasts for the second device is above a first signal strength threshold, and (ii) that the second device is not currently registered as being on the network by comparing the second device against a list of registered devices on the network stored in memory on the first device, to thereby determine that the second device is new to the network;
rebroadcast the self-identifying broadcast from the second extinguisher so that the second device is capable of being registered into the network via a system panel that monitors activities around the network; and receive instructions from the system panel to update the list of registered devices to include the second device; and wherein the first device is configured to monitor the network for alert conditions based on activities of the second device, and when the first device identifies an alert condition exists, the first device is configured to broadcast into the network an alert message, wherein the first device is configured to identify an alert condition when:

failing to receive periodic self-identifying broadcasts from the second device for a period of time that is greater than a first time threshold; or periodic self-identifying broadcasts from the second device fall below a second signal strength threshold for a period of time that is greater than a second time threshold; and wherein the panel is configured to determine that an alert condition exists, indicative of a hazard condition, after:

directly detecting, within a predetermined period of time, actions of the first and second devices that implicates the existence of an alert condition; or receiving a forwarded broadcast, within the predetermined period of time, that implicate an alert condition exists based on the actions of the first and second devices.

2. The system of claim 1 wherein the first device is configured to determine that the second device is currently registered as being on the network and that the signal strength of the self-identifying broadcasts for the second device is above the first signal strength threshold.

3. The system of claim 1, wherein the first device is configured to monitor the network for a maintenance request from the second device, and when the first device receives the maintenance request from the second device, the first device retransmits into the network the maintenance request into the network.

4. The system of claim 1, wherein the first device is configured to receive from another device on the network a broadcast that indicates one or more of (i) the second device is new to the network, (ii) an alert condition exists in the network, (iii) the second device requires maintenance, and the first device retransmits the broadcast to the network.

5. The system of claim 4 comprising the system panel, wherein the system panel directly or through retransmitted broadcasts is configured to:

(i) determine that the second device is added to the network and broadcast instructions to network devices to recognize the second device as being part of the network;

(ii) determine that an alert condition exists and broadcasting instructions to station panels to visually and/or audibly indicate that an alert condition exists; and (iii) determine that the second device requires maintenance and broadcast instructions directed to one of plural station panels on the network to visually display and/or audibly indicate that the second device requires maintenance.

6. A method of monitoring a system by a first device of a plurality of devices that is operatively connected over a network for responding to a detected hazard, the method including the first device:

monitoring the network for self-identifying broadcasts, including a unique identifier and device type, from the plurality of devices, and receiving over the network self-identifying broadcasts from a second device, wherein the first device type is a hazard detector, or a station panel for selectively relaying formation visually and/or audibly, and the second device type is a hazard extinguisher, the first and second device types being different from each other;

determining that (i) a signal strength of the self-identifying broadcasts for the second device is above a first signal strength threshold, and (ii) that the second device is not currently registered as being on the network by comparing the second device against a list of registered devices on the network stored in memory on the first device, to thereby determine that the second device is new to the network;

rebroadcasting the self-identifying broadcast from the second extinguisher so that the second device is capable of being registered into the network via a system panel that monitors activities around the network; and receiving instructions from the system panel to update the list of registered devices to include the second device; and wherein the first device monitors the network for alert conditions based on activities of the second device, and when the first device identifies an alert condition exists, the first device broadcasts into the network an alert message, wherein the first device identifies an alert condition when:

failing to receive periodic self-identifying broadcasts from the second device for a period of time that is greater than a first time threshold; or periodic self-identifying broadcasts from the second device fall below a second signal strength threshold for a period of time that is greater than a second time threshold, and wherein the panel determines that an alert condition exists, indicative of a hazard condition, after:

directly detecting, within a predetermined period of time, actions of the first and second devices that implicates the existence of an alert condition; or receiving a forwarded broadcast, within the predetermined period of time, that implicate an alert condition exists based on the actions of the first and second devices.

7. The method of claim 6 wherein the first device determines that the second device is currently registered as being on the network and that the signal strength of the self-identifying broadcasts for the second device is above the first signal strength threshold.

8. The method of claim 6, wherein the first device monitors the network for a maintenance request from the second device, and when the first device receives the maintenance request from the second device, the first device retransmits into the network the maintenance request into the network.

9. The method of claim 6, wherein the first device receives from another device on the network a broadcast that indicates one or more of (i) the second device is new to the network, (ii) an alert condition exists in the network, (iii) the second device requires maintenance, and the first device retransmits the broadcast to the network.

10. A method of claim 9, comprising the system panel directly or through retransmitted broadcasts:

(i) determining that the second device is added to the network and broadcast instructions to network devices to recognize the second device as being part of the network;

(ii) determining that an alert condition exists and broadcasting instructions to station panels to visually and/or audibly indicate that an alert condition exists; and
(iii) determining that the second device requires maintenance and broadcast instructions directed to one of plural station panels on the network to visually display and/or audibly indicate that the second device requires maintenance.

\* \* \* \* \*